United States Patent [19]

Konig et al.

[11] Patent Number: 5,594,087
[45] Date of Patent: Jan. 14, 1997

[54] POLYURETHANE THICKENERS AND THEIR USE FOR THICKENING AQUEOUS SYSTEMS

[75] Inventors: Klaus König, Odenthal; Jan Mazanek, Küln; Jurgen Schwindt; Manfred Dietrich, both of Leverkusen; Gerhard Klein, Monheim, all of Germany

[73] Assignee: Bayer Aktiengesellschaft, Leverkusen, Germany

[21] Appl. No.: 286,040

[22] Filed: Aug. 4, 1994

[30] Foreign Application Priority Data

Aug. 16, 1993 [DE] Germany .................. 43 27 481.1

[51] Int. Cl.[6] .................................................. C08G 18/00
[52] U.S. Cl. ........................ 528/44; 528/76; 528/85; 524/589; 524/590
[58] Field of Search .......................... 528/44, 76, 85; 524/589, 590

[56] References Cited

U.S. PATENT DOCUMENTS

| | | | |
|---|---|---|---|
| 3,362,780 | 1/1968 | Kuth et al. | 8/42 |
| 4,079,028 | 3/1978 | Emmons et al. | 260/29.6 NR |
| 4,092,275 | 5/1978 | Reisch et al. | 521/137 |
| 4,155,892 | 5/1979 | Emmons et al. | 260/29.2 TN |
| 4,499,233 | 2/1985 | Tetenbaum et al. | 524/591 |
| 5,023,309 | 6/1991 | Kruse et al. | 528/49 |

FOREIGN PATENT DOCUMENTS

| | | |
|---|---|---|
| 0031777 | 7/1981 | European Pat. Off. . |
| 096882 | 12/1983 | European Pat. Off. . |
| 103147 | 3/1984 | European Pat. Off. . |
| 0495373 | 7/1992 | European Pat. Off. . |
| 498442 | 8/1992 | European Pat. Off. . |
| 3630319 | 3/1988 | Germany . |

Primary Examiner—James J. Seidleck
Assistant Examiner—Duc Truong
Attorney, Agent, or Firm—Joseph C. Gil; Thomas W. Roy

[57] ABSTRACT

Water soluble or water dispersible polyurethane, which are suitable as thickeners for aqueous systems and prepared from a selected alcohol component a) based on a hydrophilic/hydrophobic mixture of alcohols and an isocyanate component b), and to their use for thickening aqueous systems.

17 Claims, No Drawings

POLYURETHANE THICKENERS AND THEIR USE FOR THICKENING AQUEOUS SYSTEMS

BACKGROUND OF THE INVENTION

1. Field of the Invention

The invention relates to new hydrophilic/hydrophobic polyurethanes which are soluble or dispersible in water, suitable as thickeners for aqueous systems and distinguished by having a particularly efficient thickening action, and to their use for the thickening of aqueous systems.

2. Description of the Prior Art

Polyurethane-based thickeners for aqueous systems are described in numerous publications (cf., for example, DE-OS 1,444,243, DE-OS 3,630,319, EP-A 0,031,777, EP-A 0,307,775, EP-A 0,495,373, U.S. Pat. No. 4,079,028, U.S. Pat. No. 4,155,892, U.S. Pat. No. 4,499,233 and U.S. Pat. No. 5,023,309).

These prior art thickeners have in common the simultaneous presence of (i) hydrophilic segments in a quantity of at least 50% by weight, (ii) hydrophobic segments in a quantity of at most 10% by weight and (iii) urethane groups. "Hydrophilic segments" are understood in this connection to be polyether chains having at least 5 alkylene oxide units, in which the alkylene oxide units contain at least 60 mol-% of ethylene oxide units. "Hydrophobic segments" are understood in this connection to be in particular hydrocarbon segments having at least 6 carbon atoms incorporated inside the chain and/or preferably terminally.

The thickeners according to the invention described below also preferably correspond to this definition.

These polyurethane thickeners are suitable as auxiliary substances for adjusting the flow properties of aqueous systems such as automotive and industrial coatings, finishes and paints, printing inks and textile dyes, pigment printing pastes, pharmaceutical and cosmetic compositions, formulations for plant protection and filler dispersions.

Although the known polyurethane thickeners are widely used, they have a thickening action that is too low for many fields of application. As a result they must either be used in comparatively high concentrations or else other measures must be taken to increase the viscosity, such as increasing the concentration of the pigment or solids. However, this may lead to undesirable changes in the properties associated with the application of the paints or other formulations prepared, for example, flow, curing behavior, gloss or hiding power.

A particular problem in the use of polyurethane thickeners is that they must have an effective action not only at low shear rates (which is important for the settling behavior and flow of paints), but also at high rates of shear (high shear range) which occur when formulations are applied, for example, with a brush or a roller or by spraying. For this reason in the prior art as a rule, two basic types of thickeners are used in one formulation for the respective ranges of shear rates, or otherwise auxiliary substances are added, such as solvents, in order to reduce the low-shear viscosity.

In the past many attempts were made to improve the effectiveness of aqueous polyurethane thickeners. Thus, for instance, the thickening action at low shear rates (low shear range) could be improved by increasing the length or the proportion of hydrophobic end groups. However, the effectiveness of such thickeners in the high shear range is inadequate for many fields of application.

On the other hand, improvements were attained in the high shear range, for example, by the incorporation of substituted ethane diols or ethylene diamines having long hydrophobic side chains. However, such thickeners showed inadequate effectiveness in the low shear range.

These thickeners therefore have the feature in common that they contain as hydrophobic groups either terminal alkyl groups and/or branched groups incorporated in the polymer chains by the reaction of hydrophobic short-chain diols or diamines containing lateral groups with, for example, diisocyanate prepolymers.

An object of the present invention is to provide new thickeners based on polyurethanes for aqueous or predominantly aqueous systems which have a well-balanced thickening action both in the low shear range and in the high shear range.

This object may be achieved with the water soluble or water dispersible, hydrophilic/hydrophobic polyurethanes according to the invention described in more detail below. Essential to the invention is the incorporation of selected hydrophilic or hydrophobic segments using a specific mixture of alcohols as co-reactant for the isocyanate component.

SUMMARY OF THE INVENTION

The present invention relates to water soluble or water dispersible polyurethanes, which are suitable as thickeners for aqueous systems, and are prepared by reacting at an NCO/OH equivalent ratio of 0.8:1 to 1.4:1 a) an alcohol component containing
  a1) 25 to 80 mol-% of compounds corresponding to the formula

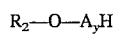
  $$R_2\text{—O—}A_y\text{H}$$

a2) 10 to 60 mol-% of compounds corresponding to the formula

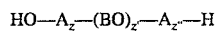
  $$HO\text{—}A_z\text{—}(BO)_z\text{—}A_z\text{—}H$$

and
  a3) 5 to 60 mol-% of compounds corresponding to the formula

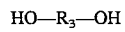
  $$HO\text{—}R_3\text{—}OH$$

with b) an isocyanate component having an average NCO-functionality of 1.5 to 2.5 and containing at least one organic isocyanate corresponding to the formula

  $$R_1(NCO)_x$$

wherein
  $R_1$ represents an aliphatic, cycloaliphatic, aromatic or araliphatic hydrocarbon radical having 6 to 28 carbon atoms and optionally inert substituents,
  $R_2$ represents an aliphatic hydrocarbon radical having 12 to 24 carbon atoms,
  $R_3$ represents an aliphatic or araliphatic hydrocarbon radical having 4 to 36 carbon atoms and optionally ether oxygen atoms, provided that at least 3 carbon atoms are arranged between the two hydroxyl groups and the numerical ratio of carbon atoms to the ether oxygen atoms optionally present is at least 2.5:1, A) represents an alkylene oxide radical having 2 or 3 carbon atoms, (i.e. ethylene oxide or propylene oxide radicals), wherein the proportion of radicals having 3 carbon atoms is not greater than 40 mol-%, and different alkylene oxide radicals may be present in any distribution, B) represents an aliphatic hydrocarbon radical having 2 to 18 carbon atoms, a cycloaliphatic hydrocarbon radical having 4 to 13 carbon atoms or an aromatic hydrocarbon radical having 6 to 15 carbon atoms, x represents an integer or on average a fractional number from 1.5 to 2.5, y represents a number of 5 to 200, z and z" each represent numbers from 0 to 400, provided that the sum of z+z" is 10 to 400, and Z' represents 0 or 1, wherein the sum of the percentages of a1), a2) and a3) total 100 and the weight of the radicals $R_2$ and $R_3$, based on the total weight of the component a), is less than 15% by weight.

The invention also relates to the use of these polyurethanes for the thickening of aqueous systems.

DETAILED DESCRIPTION OF THE INVENTION

The alcohol component a1) is selected from hydrophobic/hydrophilic monovalent alcohols corresponding to the formula $$R_2—O—A_y H$$

wherein $R_2$, A and y have the meanings given above.

Preferably, $R_2$ represents an aliphatic hydrocarbon radical having 16 to 22, more preferably 16 to 18 carbon atoms, A represents ethylene oxide and/or propylene oxide, provided that at least 60 mol-%, more preferably 100 mol-%, of the radicals are ethylene oxide radicals, and y represents a number from 30 to 150.

The preparation of polyether alcohols a1) takes place in known manner by the alkoxylation of the corresponding monovalent alcohols corresponding to the formula $$R_2—OH$$

using ethylene oxide and optionally propylene oxide in admixture and/or in any sequence. Suitable starting materials include the isomeric dodecanols, tetradecanols, hexadecanols, octadecanols, behenyl alcohol, alcohols formed by the hydrogenation of fatty acid mixtures and mixtures of such monovalent alcohols. The linear primary alcohols are particularly preferred as starting materials for the preparation of alcohol component a1).

Alcohol component a2) is selected from hydrophilic diols corresponding to the formula $$HO—A_z—(BO)_{z'}—A_{z''}—H$$

wherein

A has the meaning and preferred meaning given above,

B has the meaning given above and preferably represents an aliphatic hydrocarbon radical having 2 to 6 carbon atoms, a cycloaliphatic hydrocarbon radical having 6 carbon atoms or an aromatic hydrocarbon radical having 6 to 13 carbon atoms, z and z" have the meanings given above and each preferably represent numbers from 0 to 300, provided that the sum of z and z" is 100 to 300, and z' represents 0 or 1, preferably 0.

The preparation of diols a2) takes place by the known alkoxylation of suitable starter molecules using ethylene oxide and optionally propylene oxide as described above. Suitable starter molecules include water, ethylene glycol, oligoethylene glycol, propylene glycol, oligopropylene glycol, the isomeric butanediols or hexanediols, neopentyl glycol, hydroquinone, resorcinol, 1,4-dihydroxyhexane, 4,4'-dihydroxydiphenylmethane and 1,4-bis-(hydroxymethyl)-cyclohexane. The use of water or ethylene glycol as starting materials and ethylene oxide as the only alkylene oxide is particularly preferred, such that the component a2) is based on polyethylene glycols.

The alcohol component a3) is selected from diols corresponding to the formula $$HO—R_3—OH$$

wherein $R_3$ has the meaning given above. In these diols $R_3$ preferably represents a linear or branched, more preferably linear aliphatic hydrocarbon radical having 4 to 36, in particular 6 to 18 hydrocarbon atoms. The diols may also contain ether oxygen atoms, provided that the numerical ratio of carbon atoms to ether oxygen atoms is at least 2.5:1, preferably at least 3:1.

Specific examples of suitable diols a3) are butanediol-1,4, neopentyl glycol, hexanediol-1,6, di-, tri- and tetrapropylene glycol, octanediol-1,8,2-ethylhexanediol-1,3,2,2,4-trimethylpentanediol-1,3,2,4,4-trimethylhexane-diol-1,6, decanediol-1,10, nonanediol-1,9, dodecanediol-1,12, hexadecanediol-1,16, octadecanediol-1,12, the diol based on hydrogenareal dimeric fatty acid that is available as Pripol 2023 by Henkel, hydrogenated aromatic diols and bis-2-hydroxyalkyl ether aromatic diols. Low molecular weight oligoethylene glycols such as di-, tri- or tetraethylene glycol may also be used but are less preferred. Mixtures of different diols may also be used as component a3).

Alcohol component a) preferably contains 30 to 70, in particular 35 to 65 mol-% of alcohols a1); 15 to 45, in particular 20 to 40 mol-% of alcohols a2); and 15 to 45, in particular 15 to 40 mol-% of alcohols a3), wherein the percentages total 100. Components a1) and a2) are preferably selected such that the sum of the average molecular weights of components a1) and a2), which can be calculated from the hydroxyl group content and the hydroxyl functionality, is between 6,000 and 18,000. This sum may be achieved by using comparatively short chain polyethers a1) in combination with long chain polyethers a2) or vice versa.

Isocyanate component b) is selected from compounds corresponding to the formula $$R_1(NCO)_x$$

wherein $R_1$ and x have the meanings given above.

Preferred isocyanates are those wherein $R_1$ represents an aliphatic, cycloaliphatic, aromatic or araliphatic hydrocarbon radical having 6–21, in particular 6–10 carbon atoms and x represents an integer or on average a fractional number from 1.8 to 2.2, more preferably 1.9 to 2.1 and most preferably 2.

Both single compounds corresponding to the given definition and mixtures of isocyanates may thus be used as component b). Examples include hexamethylene diisocyanate, dodecamethylene diisocyanate, isophorone diisocyanate, 4,4'-diisocyanatodicyclohexylmethane, 1,4-diisocyanatocyclohexane, 2,4- and 2,6-diisocyanatotoluene and 4,4'-diisocyanatodiphenylmethane and mixtures thereof with the 2,4'-isomer and optionally the 2,2'-isomer and/or mixtures thereof with its higher polyisocyanates. Also suitable are the known higher functional coating polyisocyanates such as polyisocyanates prepared from hexamethylene diisocyanate and having biuret groups or isocyanurate groups. Monoisocyanates, such as hexyl isocyanate, phenyl isocyanate or stearyl isocyanate, may also be used as a portion of component b).

Component b) is used in the preparation of the polyurethanes according to the invention in quantities which correspond to an NCO/OH equivalent ratio, based on the isocyanate groups of component b) and the hydroxyl groups of component a), of 0.8:1 to 1.4:1, preferably 0.9:1 to 1.2:1. It is preferable to operate with equivalent amounts of components a) and b), but due to the often unavoidable water content of the hydrophilic polyether components, a small excess of isocyanate within the limits of the preceding ranges is frequently advantageous to compensate for the moisture.

The preparation of the polyurethanes according to the invention generally takes place at a temperature of 60° to 150° C., preferably 80° to 120° C. Conventional catalysts such as dibutyltin dilaurate or tin(II) octoate can be used to accelerate the reaction. Generally the final viscosity of the polyurethanes according to the invention at the reaction temperature is low enough to be dispense with inert solvents. However, when solvents have been used (such as toluene or xylene), particularly in the dehydration of alcohols a) by azeotropic distillation, they may remain in the reaction mixture and be removed only after the reaction is over.

The preparation of the polyurethanes according to the invention takes place in a one-step or multi-step reaction. The reaction of the entire quantity of component a) with the entire quantity of component b) is understood as being a one-step reaction. In a multi-step reaction a portion of alcohol component a), or, for example, only one of the single components a1), a2) or a3) is reacted with the entire quantity of the isocyanate component b) and subsequently the resulting NCO-prepolymer is reacted with the remaining quantity of alcohols a). The order of the reactions in this case is essentially immaterial.

The polyurethanes according to the invention essentially colorless to yellowish waxes having softening points or softening regions within the temperature range of 40° to 80° C. For subsequent use it is often advantageous to mix the polyurethanes according to the invention with additives, such as formulating agents, solvents, water, emulsifiers or stabilizers, to make liquid formulations.

The polyurethanes according to the invention are suitable as thickeners for aqueous or predominantly aqueous systems such as paints, printing pastes and pigment pastes, filler dispersions and pigment dispersions, auxiliary substances for textiles, leather and paper, preparations for petroleum production, preparations for detergents, adhesives, waxes for polishes, formulations for pharmaceutical and veterinary purposes, formulations for plant protection and cosmetic articles. Water alone can also be thickened with the polyurethane thickeners according to the invention. The thickened water may then optionally be mixed with further additives or added to aqueous preparations. The thickeners according to the invention may also be used in mixtures with other thickeners such as those based on polyacrylates, cellulose derivatives or inorganic thickeners.

Examples of aqueous systems that can be thickened according to the invention are aqueous polymer dispersions such as polyacrylate dispersions, aqueous dispersions of mixtures of polymerizates of olefinically unsaturated monomers, aqueous polyvinyl acetate dispersions, aqueous polyurethane dispersions, aqueous polyester dispersions and particularly ready-for-use preparations of the kind discussed above based on such dispersions.

The thickeners according to the invention may be used as solids, preferably as granules or optionally as powders. However, It is preferred to use liquid formulations, which besides the polyurethanes according to the invention contain water, solvents (such as butyl diglycol, isopropanol, methoxypropyl acetate, ethylene glycol and/or propylene glycol), nonionic emulsifiers, tensides and/or optionally other additives. These additives considerably facilitate the incorporation of the thickeners according to the invention into aqueous or predominantly aqueous systems.

Ready-to-use preparations of the thickeners according to the invention are aqueous solutions or dispersions having a solids content of 10 to 80, preferably 30 to 60, and more preferably 40 to 50% by weight.

The quantity of thickener which is added to the aqueous or predominantly aqueous systems in order to attain the desired thickening depends in each case on the intended use and can be determined by a few preliminary tests by the person skilled in the art. Generally, from 0.05 to 10% by weight, preferably 0.1 to 4% by weight and more preferably 0.1 to 1% by weight of the thickener according to the invention is used, based on the weight of the aqueous system to be thickened. These percentages refer to the solids content of the thickener and the aqueous system to be thickened.

The effectiveness of the thickeners according to the invention can be evaluated by known methods, for example, in a Haake rotating viscometer, a Stormer viscometer, a Brookfield viscometer or an ICI viscometer.

The following examples further illustrate the invention. All molecular weight values refer to the average molecular weight of the alcohols, which can be calculated from the OH-content and the OH-functionality.

EXAMPLES

Example 1

748 g (0.2 mol) of a polyethylene oxide polyether based on stearyl alcohol and having an average molecular weight of 3740 (=a1), together with 748 g (0.1 mol) of polyethylene glycol having a molecular weight of 7480 (=a2), were melted, heated to 120° C. and dehydrated for 3 hrs at 10 mbar. Following the addition of 5.9 g (0.05 mol) of hexanediol-1,6 (=a3), 46.2 g (0.275 mol) of hexamethylene diisocyanate (HDI=b) was added all at once with stirring at 80° C. After 2 h at 80° C., 200 mg of tin dioctate was added as a catalyst and the reaction completed in 2 hours at 120° C. After pouring onto a metal sheet and cooling, a pale yellowish wax was obtained.

Examples 2 to 8

The procedure described in Example 1 was followed, maintaining the components a 1 ) and a2) but varying the type and/or quantity of the components a3) and b). Details are set forth in Table 1 below.

TABLE 1

| Example No. | Component a3) Structure | Mol | Diisocyanate (b) | NCO/OH-ratio | Catalyst |
|---|---|---|---|---|---|
| 2 | Hexanediol-1,6 | 0.1 | HDI | 1.05 | Dibutyltin dilaurate (200 mg) |
| 3 | Hexanediol-1,6 | 0.1 | 2,4-tolylene diisocyanate | 1.1 | Diazabicyclo-octane (100 mg) |
| 4 | Dodecane-diol-1,12 | 0.035 | HDI | 1.0 | — |
| 5 | Dodecene-diol-1,12 | 0.05 | HDI | 1.1 | Titanium tetrabutylate (200 mg) |
| 6 | Dodecane-diol-1,12 | 0.1 | HDI | 1.1 | Dibutyltin dilaurate (200 mg) |
| 7 | Dodecane-diol-1,12 | 0.05 | Isometric Mixture of 2,4- and 2,6-tolylene diisocyanate 80:20 | 0.95 | Dibutyl dilaurate (200 mg) |
| 8 | Octadecane-diol-1,18 | 0.025 | HDI | 1.1 | Dibutyltin dilaurate (200 mg) |

Example 9

196 g (0.2 mol) of a polyethylene oxide polyether (=a1) based on dodecanol-1 and having an average molecular weight of 980, after dehydration, was reacted while stirring for 12 h at 100° C. with 106.4 g of 4,4'-diisocyanatodicyclohexylmethane (available as Desmodur W from Miles) (=b). Then 1,360 g (0.2 mol) of dehydrated polyethylene glycol having a molecular weight of 6 800 (=a2) and 19.4 g (0.1 mol) of tetraethylene glycol (=a3) was stirred in. After 1 h 500 mg of tin dioctoate was added and the reaction was completed in 5 h at 120° C. Upon cooling an almost colorless wax was obtained.

Example 10

600 g (0.2 mol) of polyethylene glycol having a molecular weight of 3000 (=a2) was dehydrated, mixed at 100° C. with 122.1 g (0.55 mol) of isophorone diisocyanate (=b) and reacted with stirring over a period of 8 h (titrimetric NCO-control). Then the prepolymer was mixed with 1200 g (0.3 mol) of a polyethylene oxide polyether based on a commercial mixture of fatty alcohols ($C_{14}$ to $C_{20}$, average chain length 17.5) and having an average molecular weight of 4000 (=a 1) and subsequently with 20.8 g (0.2 mol) of neopentyl glycol (=a3). After 1 h at 120° C, 500 mg of dibutyltin dilaurate was added and the reaction completed after 3 h at 120° C. (NCO-control by SR measurements). A light yellow wax was formed.

Example 11

740 g (0.2 mol) of a polyethylene oxide polyether based on behenyl alcohol and having an average molecular weight of 3700 (=a1) and 680 g (0.1 mol) of a polyethylene glycol having an average molecular weight of 6800 (=a2) and 1 l of toluene were azeotropically dehydrated together at 120° C./1 mbar. After cooling to 60° C., 75 g (0.3 mol) of 4,4'-diphenylmethane diisocyanate (=b) in liquid form was stirred in and reacted over a period of 12 h to form a prepolymer. Then 9 g (0.1 mol) of butanediol-1,4 (=a3) was added and the temperature elevated to 100° C. After 4 h of stirring at 100° C., no more NCO could be detected by SR spectroscopy. On cooling a yellow wax was obtained.

Examples of Application

The following Examples A1 to A11 demonstrate that with the use of the thickeners according to the invention latex paints can be obtained which display improved working properties (for example, sedimentation stability of the paint and its applicability, flow and suitability for forming greater film thicknesses). Films produced by brush application of the latex paint to a plastic foil (Linetta foil) were evaluated on a scale of 1 (very good) to 5 (very bad). The viscosities of the paints produced with the thickeners according to the invention and the yield values were measured with a Haake viscometer or ICI viscometer at 1 to 80 or at $10^4 s^{-1}$.

Examples A 1 to A 11

Acrylate-based latex gloss paints containing 5 g each of the polyurethane thickeners according to the invention and the following ingredients were prepared:

| | |
|---|---|
| AMP 90[1] | 2.5 g |
| Borchigen ND[2], 25% in water | 13.6 g |
| Borchigen DFN[2], 100% | 5.0 g |
| Neocryl AP 2860[3] | 3.2 g |
| TiO$_2$-RHD-2 | 225.0 g |
| Methoxybutanol | 17.0 g |
| Propylene glycol | 17.0 g |
| Butyl diglycol | 17.0 g |
| Water | 44.7 g |
| Neocryl XK 62[4] | 540.0 g |
| Water | 110.0 g |

[1](2-Amino-2-methylpropanol-1, 90% in water), Angus Chemie GmbH, Essen
[2]Wetting agent, Gebr. Borchers AG, Goslar
[3]Defoaming agent, ICI Resins, Runcorn, England
[4]Anionic copolymer emulsion based on acrylate/styrene, ICI Resins The results of the tests are set forth in Table 2.

TABLE 2

| Example No. | Thickener Example No. | Viscosity at [s⁻¹] [Pa · s] | | | Working properties |
|---|---|---|---|---|---|
| | | 1 | 10 | 10⁴ | |
| A1 | 1 | 28.3 | 22.1 | 0.17 | 2 |
| A2 | 2 | 22.7 | 20.2 | 0.16 | 2 |
| A3 | 3 | 22.0 | 17.8 | 0.14 | 1–2 |
| A4 | 4 | 28.1 | 18.1 | 0.16 | 2–3 |
| A5 | 5 | 26.5 | 17.2 | 0.15 | 1 |
| A6 | 6 | 23.3 | 19.3 | 0.15 | 1 |
| A7 | 7 | 34.2 | 27.7 | 0.16 | 3 |
| A8 | 8 | 29.3 | 21.2 | 0.15 | 1 |
| A9 | 9 | 27.3 | 19.6 | 0.14 | 2 |
| A10 | 10 | 21.6 | 27.4 | 0.16 | 1 |
| A11 | 11 | 29.2 | 21.8 | 0.15 | 1–2 |
| Comparison Example 1[a] | | 17.3 | 16.1 | 0.07 | 5[b] |

[a] Comparison Example 1 corresponded to Example A1, but as thickener a polyurethane was used which had been prepared analogously to Example 1, but without component a3) and a corresponding reduction of the component b) (so that the same NCO/OH equivalent ratio was obtained).
[b] Particularly poor flow and low film thicknesses.

Example A 12

A latex paint containing 1.4 g of the polyurethane thickener from Example 1 and the following ingredients was prepared:

| | |
|---|---|
| Water | 30.5 g |
| Borchigen ND[1], 25% in water | 8.6 g |
| Borchigen DFN[1], 100% | 1.4 g |
| Nopco 8034 E[2] | 2.0 g |
| Mergal KM 101[3] | 2.0 g |
| Propylene glycol | 33.3 g |
| Butyl diglycol | 33.3 g |
| Methoxybutanol | 33.3 g |
| TiO$_2$-RHD 2[4] | 220.0 g |
| Mowilith DM 777[5] | 585.0 g |
| NH⁴OH | 4.0 g |
| Südranol 230[6] | 30.0 g |

[1] Wetting agent, Gebr. Borchers AG, Goslar
[2] Henkel, Düsseldorf
[3] Riedel de Haen
[4] Tioxide
[5] Hoechst AG, Frankfurt/M
[6] Süddeutsche Emulsionschemie, Mannheim The latex paint had excellent working properties. The following values were obtained for the viscosity:

| Viscosity at [s⁻¹] [Pa · s] | | | |
|---|---|---|---|
| 1 | 10 | 40 | 80 |
| 36 | 16 | 10 | 7 |

Example A 13

A latex paint containing 6.3 g of the polyurethane thickener from Example 1 and the following ingredients was prepared:

| | |
|---|---|
| Water | 42.0 g |
| AMP 90[1] | 2.6 g |
| Borchigen DFN[2], 25% in water | 15.1 g |
| Nopco 8034 E[3] | 1.0 g |
| Borchigen DFN[2], 100% | 1.0 g |
| Mergal KM 101[4] | 2.1 g |
| TiO$_2$-RHD 2[5] | 233.0 g |
| Propylene glycol | 20.0 g |
| Butyl diglycol | 10.0 g |
| Water | 100.7 g |
| Ubatol 150[6] | 560.0 g |

[1] Wetting agent, Angus Chemie GmbH, Essen
[2] Wetting agent, Gebr. Borchers AG, Goslar
[3] Henkel, Dusseldorf
[4] Riedel de Haen
[5] Tioxide
[6] Cray Valley Prod. Ltd., Farnborough, GB The latex paint had excellent working properties. The following values were obtained for the viscosity:

| Viscosity at [s⁻¹] [Pa · s] | | | |
|---|---|---|---|
| 1 | 10 | 40 | 80 |
| 14 | 9 | 6 | 4.5 |

Examples A 14 and A 15

These examples demonstrate that the thickeners according to the invention have a well-balanced action in an acrylate dispersion. Measurement of thickening action:

To 98 g each of a commercial polyacrylate dispersion (Dilexo RA3 available from Condea, 2000 Hamburg) were added 2 g of an aqueous solution of a thickening composition containing a polyurethane thickener and Borchigen DFN (firm Borchers, Goslar) in the ratio by weight 1:1. The concentration of the solutions is 2.5% by weight, based on the polyurethane thickener. The mixtures thus prepared were stirred for 5 minutes at 2000 rev./min. The homogeneous dispersions thus obtained were stored for 24 h at 23° C.

The viscosity of the dispersions thus obtained were measured in a Haake viscometer RV 100, measuring body SV DIN, at 23° C. and 10.3 s¹:

| Example No. | Thickener from Example No. | Viscosity [Pa · s] |
|---|---|---|
| A 14 | 2 | 9.9 |
| A 15 | 5 | 7.8 |

Examples 16 to 19

The procedure described in Examples A 14 and A 15 was followed, but varying quantities of thickener were used. The results are summarized in Table 3.

TABLE 3

| Example No. | Thickener from Example No. | Viscosity of [Pa · s] at [s⁻¹] 10 | Addition [g] solution |
|---|---|---|---|
| A 16 | 2 | 5.5 | 1 |
| A 17 | 2 | 12.5 | 4 |
| A 18 | 5 | 3.2 | 1 |
| A 19 | 5 | 13.9 | 4 |

Examples A 20 to A 23

These examples demonstrate the effectiveness of the thickener according to the invention for thickening water (Table 4).

TABLE 4

| Example No. | Thickener from Example No. of | Viscosity [Pa · s] at [s$^{-1}$] 10 | Addition [g] solution |
|---|---|---|---|
| A 20 | 5 | 2.0 | 2.5 |
| A 21 | 6 | 0.6 | 2.5 |
| A 22 | 5 | 25.0 | 5.0 |
| A 23 | 6 | 27.1 | 5.0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water soluble or water dispersible polyurethane, which is suitable as a thickener for aqueous systems, and is prepared by reacting at an NCO/OH equivalent ratio of 0.8:1 to 1.4:1
   a) an alcohol component containing
      a1) 25 to 80 mol-% of one or more compounds corresponding to the formula $$R_2-O-A_yH$$

a2) 10 to 60 mol-% of one or more compounds corresponding to the formula $$HO-A_z-(BO)_{z'}-A_{z''}-H$$

and
      a3) 5 to 60 mol-% of one or more compounds corresponding to the formula $$HO-R_3-OH$$

with
   b) an isocyanate component having an average NCO-functionality of 1.5 to 2.5 and containing at least one organic isocyanate corresponding to the formula $$R_1(NCO)_x$$

wherein
   $R_1$ represents an aliphatic, cycloaliphatic, aromatic or araliphatic hydrocarbon radical having 6 to 28 carbon atoms and optionally inert substituents,
   $R_2$ represents an aliphatic hydrocarbon radical having 12 to 24 carbon atoms,
   $R_3$ represents an aliphatic or araliphatic hydrocarbon radical having 4 to 36 carbon atoms and optionally ether oxygen atoms, provided that at least 3 carbon atoms are arranged between the two hydroxyl groups and the numerical ratio of carbon atoms to the ether oxygen atoms optionally present is at least 2.5:1,
   A) represents an alkylene oxide radical having 2 or 3 carbon atoms, wherein the proportion of radicals having 3 carbon atoms is not greater than 40 mol-%, and different alkylene oxide radicals may be present in any distribution,
   B) represents an aliphatic hydrocarbon radical having 2 to 18 carbon atoms, a cycloaliphatic hydrocarbon radical having 4 to 13 carbon atoms or an aromatic hydrocarbon radical having 6 to 15 carbon atoms,
   x represents an integer or on average a fractional number from 1.5 to 2.5,
   y represents a number of 5 to 200,
   z and z" each represent numbers from 0 to 400, provided that the sum of z+z" is 10 to 400, and
   z' represents 0 or 1,
   wherein the sum of the percentages of a1), a2) and a3) total 100 and the weight of the radicals $R_2$ and $R_3$, based on the total weight of the component a), is less than 15% by weight.

2. The polyurethane of claim 1 wherein said NCO/OH equivalent ratio is 0.9:1 to 1.2:1.

3. The polyurethane of claim 1 wherein $R_2$ represents an aliphatic hydrocarbon radical having 16 to 18 carbon atoms.

4. The polyurethane of claim 2 wherein $R_2$ represents an aliphatic hydrocarbon radical having 16 to 18 carbon atoms.

5. The polyurethane of claim 1 wherein A consists essentially of ethylene oxide radicals, y represents a number of 30 to 150, z and z" each represent numbers of 0 to 300, provided that the sum of z+z" is 100 to 300 and z' represents 0.

6. The polyurethane of claim 2 wherein A consists essentially of ethylene oxide radicals, y represents a number of 30 to 150, z and z" each represent numbers of 0 to 300, provided that the sum of z+z" is 100 to 3900 and z' represents 0.

7. The polyurethane of claim 3 wherein A consists essentially of ethylene oxide radicals, y represents a number of 30 to 150, z and z" each represent numbers of 0 to 300, provided that the sum of z+z" is 100 to 300 and z' represents 0.

8. The polyurethane of claim 4 wherein A consists essentially of ethylene oxide radicals, y represents a number of 30 to 150, z and z" each represent numbers of 0 to 300, provided that the sum of z+z" is 100 to 300 and z' represents 0.

9. The polyurethane of claim 1 wherein component a3) consists essentially of ω,ω'-dihydroxyalkanes having 6 to 18 carbon atoms.

10. The polyurethane of claim 2 wherein component a3) consists essentially of ω, ω'-dihydroxyalkanes having 6 to 18 carbon atoms.

11. The polyurethane of claim 3 wherein component a3) consists essentially of ω, ω'-dihydroxyalkanes having 6 to 18 carbon atoms.

12. The polyurethane of claim 4 wherein component a3) consists essentially of ω, ω'-dihydroxyalkanes having 6 to 18 carbon atoms.

13. The polyurethane of claim 5 wherein component a3) consists essentially of ω, ω'-dihydroxyalkanes having 6 to 18 carbon atoms.

14. The polyurethane of claim 6 wherein component a3) consists essentially of ω, ω'-dihydroxyalkanes having 6 to 18 carbon atoms.

15. The polyurethane of claim 7 wherein component a3) consists essentially of ω, ω'-dihydroxyalkanes having 6 to 18 carbon atoms.

16. The polyurethane of claim 8 wherein component a3) consists essentially of ω, ω'-dihydroxyalkanes having 6 to 18 carbon atoms.

17. A composition comprising an aqueous polymer dispersion and the water soluble or water dispersible polyurethane of claim 1.

* * * * *